Patented Nov. 11, 1930

1,781,649

UNITED STATES PATENT OFFICE

LORIN B. SEBRELL, OF AKRON, OHIO, ASSIGNOR TO THE GOODYEAR TIRE & RUBBER COMPANY, OF AKRON, OHIO, A CORPORATION OF OHIO

METHOD OF UNITING RUBBER AND OTHER SUBSTANCES

No Drawing. Application filed April 26, 1928. Serial No. 273,166.

This invention relates to adhesive materials and it has particular relation to a method of employing such materials which shall facilitate the provision of composite articles formed by uniting non-porous materials, such as iron or steel, and porous substances, such as cardboard, wood, tile, fabrics and the like.

The primary object of the invention resides in providing an especially economical and practical method of forming a union between materials of the above designated character which shall be substantially immune from deleterious effects of adverse atmospheric conditions or even from the direct application of moisture.

Heretofore, it has been observed that, when rubber is dissolved in a suitable solvent such as benzene, and is then treated with a polymerizing agent, such as a halide of an amphoteric metal or sulphuric acid, a thermoplastic material is formed, which, when properly treated, is capable of adhering to both metals and rubber.

A copending application of Stewart S. Kurtz, jr., Serial No. 247,751, filed Jan. 18, 1928, contains disclosures of certain methods, whereby thermoplastic compositions of this character may be manufactured and employed for uniting rubber and other materials. In accordance with the provisions of the disclosure contained in the Kurtz application, the polymerizing agent is permitted to react with the rubber for a certain predetermined period of time, after which the product is treated with a material capable of neutralizing the polymerizing agent, thus stopping the reaction before it has reached completion. The partially polymerized rubber is then dried, milled with suitable softeners and finally is redissolved in a solvent, such as benzene. The solution thus obtained is used to coat the surface of the metal to which the rubber is to be applied, and the rubber is pressed into contact with the surface coated with the solution. The whole is then subjected to heat and pressure in order to effect vulcanization of the rubber and to insure proper adhesion between the various surfaces.

This invention consists in the discovery that a cement suitable for many purposes may be formed by permitting the polymerizing agent to react with the rubber in solution for a convenient period of time and then applying the cement thus formed to the surfaces to be secured together, without neutralization of the polymerizing agent. If the surfaces to be secured together are next brought into contact, and the whole heated in a suitable oven, a satisfactory bond is formed between the surfaces. This method of procedure is particularly satisfactory for securing fibrous materials, such as cardboard, wood, tile and textile materials together, or for securing the latter substances to non-porous materials, such as iron or steel. It may also be employed for cementing together metallic bodies, such as iron or steel.

Any convenient polymerizing agent may be employed in the formation of the cement, though tetrachloride of tin has been found to be a most satisfactory material for most purposes. The following method may conveniently be employed for manufacturing the reaction product of that substance with rubber.

A cement containing 20.8 percent of rubber is formed from rubber that has been milled until it has a plasticity of approximately 2.5, as determined by the method developed by Williams (Journal of Industrial and Engineering Chemistry, 1924, p. 362). Approximately 1346 grams of this cement is then admixed with 30 cc. of a solution consisting of equal parts of benzol and thin pine tar, and finally 4.9 cc. of anhydrous tin tetrachloride ($SnCl_4$) and 1200 cc. of benzene are added. All of the ingredients should be in an anhydrous state in order to prevent hydrolysis of the tin tetrachloride, which readily takes up moisture and thereby loses its power to react with the rubber. In case the various ingredients are not entirely anhydrous, additional tin tetrachloride should be added in order to compensate for the loss of that material due to hydrolysis.

The solution thus formed is heated to the boiling point of benzene and is maintained at that temperature for a period of two hours and is then allowed to cool. The product obtained is a comparatively fluid cement in which the reaction between the rubber and the halide is not yet complete. The cement may readily be spread upon the surfaces to be joined together. After the surfaces have been duly covered with cement they are brought into contact with each other and the articles to be joined are placed in an oven and heated to a temperature ranging from 80° to 120° C. for a period of ten to thirty minutes. During this time a complete reaction occurs between the rubber and the halide. The articles are finally removed from the oven and permitted to cool. Strong and permanent unions are obtained by this method.

The proportions of the various ingredients above specified are to be considered merely as exemplary, because it is possible to vary them within relatively wide limits. The invention also is not limited to the employment of benzol as a solvent, but various other solvents which are inert to tin tetrachloride may be used in lieu thereof. The thin pine tar specified in the above formula is employed as a softening agent. Any other convenient rubber softener, such as petroleum or gilsonite, may be employed in place thereof.

The invention is not confined to cements formed of raw or unvulcanized rubber, but may be practiced by using cements obtained by heating solutions of reclaimed rubber with tin chloride under pressure.

Although I have described in detail only the preferred embodiments of the invention, it will be apparent to those skilled in the art that it is not so limited but that various minor modifications may be made therein without departing from the spirit of the invention or from the scope of the appended claims.

What I claim is:

1. A method of securing fibrous materials to metal or to each other which comprises treating a rubber cement with a polymerizing agent, permitting the materials partially to react, coating the surfaces to be secured together with the cement and then heating the body thus formed to cause the rubber and the polymerizing agent completely to react.

2. A method of securing fibrous materials to metal or to each other which comprises treating a rubber cement with a polymerizing agent to cause partial reaction, coating the surfaces to be secured together with the cement and then drying the cement by heating the materials to a temperature of approximately 80° to 120° C. to induce complete reaction between the rubber and the polymerizing agent.

3. A method of securing fibrous materials to metal or to each other which comprises treating rubber cement with a polymerizing agent to cause partial reaction and with a rubber softener, coating the surfaces to be secured together with the cement and subsequently bringing the surfaces into contact with each other and heating the articles to a temperature of 80° to 120° C. to cause complete reaction between the rubber and the polymerizing agent.

4. A method of securing fibrous materials to metal or to each other which comprises treating a rubber cement with tin tetrachloride to induce a partial reaction between the rubber and the chloride, coating the surfaces to be secured together with the cement, bringing the coated surfaces into contact with each other, and subsequently heating the articles at a temperature of approximately 80° to 120° C. to induce a complete reaction between the rubber and the chloride.

5. A method of securing fibrous materials to metal or to each other which comprises adding a rubber softener to a rubber cement, treating the cement with tin tetrachloride to cause partial reaction between the rubber and the chloride, coating the surfaces to be secured together with the cement, bringing the cement coated surfaces into contact with each other and subsequently heating the articles to be secured together to a temperature of approximately 80° to 120° C. to cause complete reaction between the rubber and the chloride.

6. A method of securing fibrous articles to metal or to each other which comprises adding a halide salt of an amphoteric metal to a rubber cement, subsequently heating the cement in order to bring about a partial reaction between the rubber and the salt, cooling the cement so treated, spreading the cement upon the surfaces of the articles to be secured together, bringing the cement coated surfaces into contact with each other and subsequently heating the body thus formed to cause complete reaction between the rubber and the salt.

7. A method of securing fibrous articles to metal or to each other which comprises treating a rubber cement with a halide salt of tin, subsequently heating the mixture thus formed to cause partial reaction between the rubber and the salt, spreading it on the surfaces to be secured together, bringing the cement coated surfaces into contact with each other and subsequently heating the articles to a temperature of 80° to 120° C. to complete the reaction between the halide and the rubber.

In witness whereof, I have hereunto signed my name.

Signed at Akron, in the county of Summit, and State of Ohio, this 25th day of April 1928.

LORIN B. SEBRELL.